Nov. 29, 1960   J. S. HALPERIN   2,961,788
CHANGEABLE DISPLAY SIGN
Filed May 21, 1959   3 Sheets-Sheet 1

INVENTOR.
Jack S. Halperin

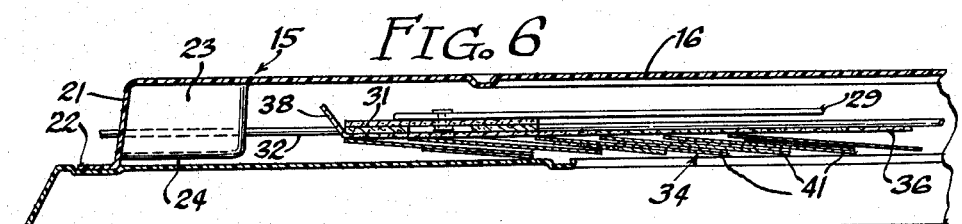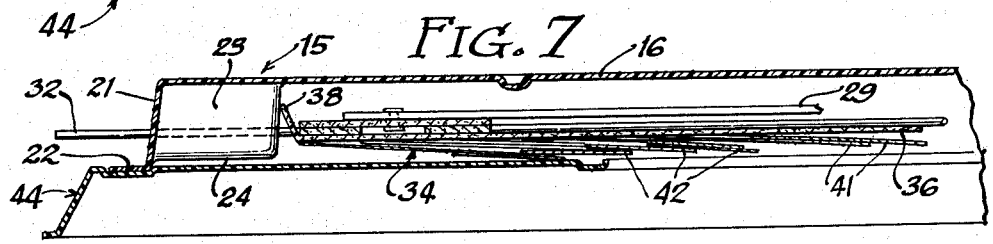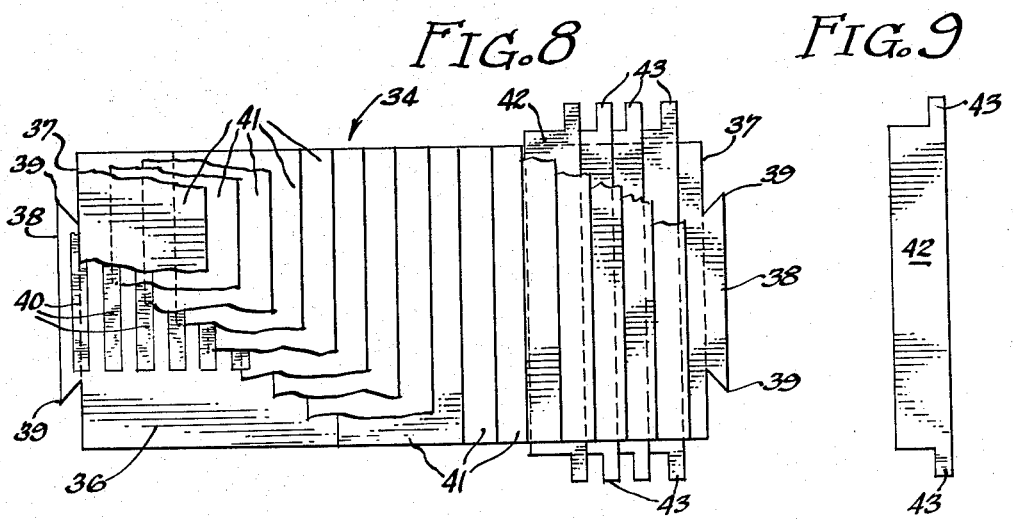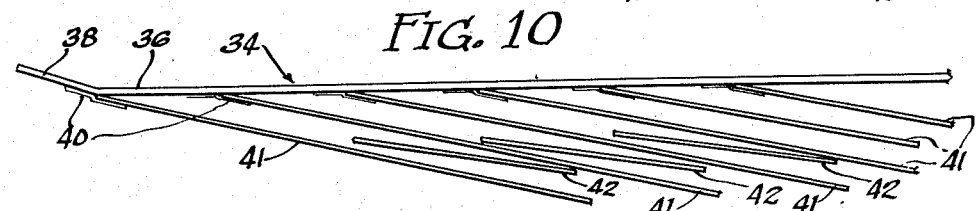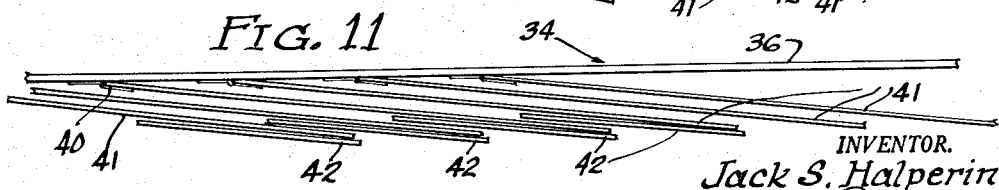

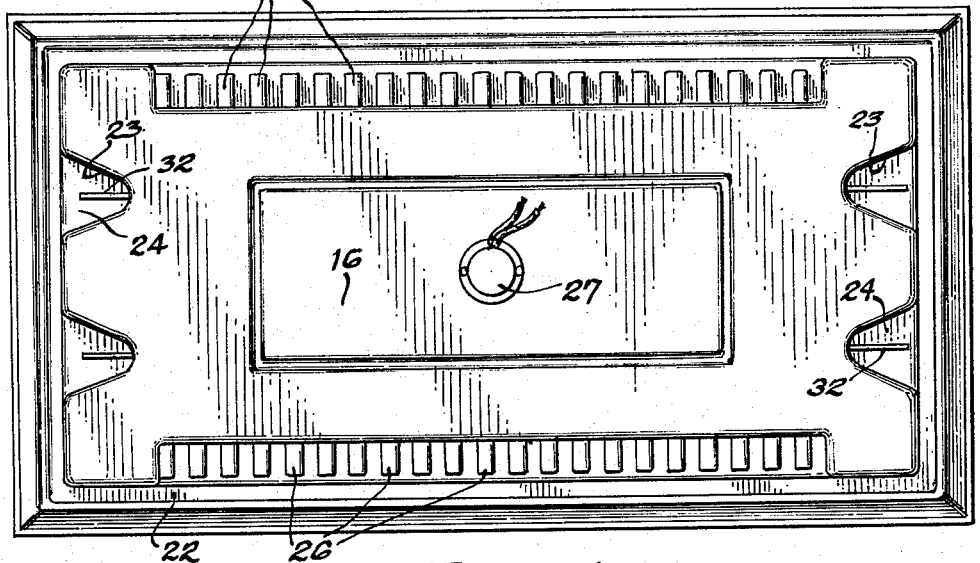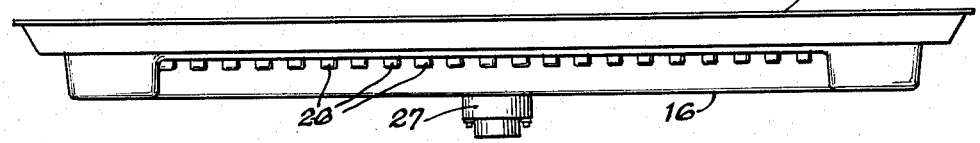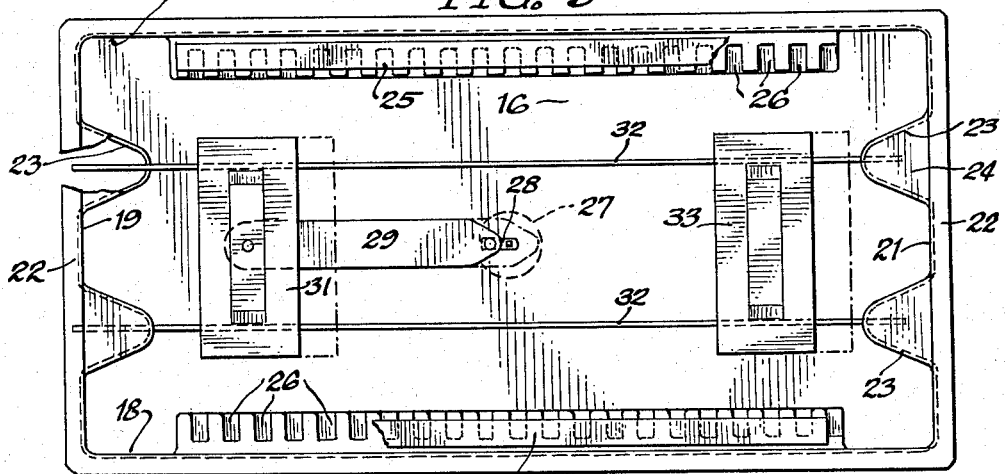

United States Patent Office 2,961,788
Patented Nov. 29, 1960

2,961,788
CHANGEABLE DISPLAY SIGN
Jack S. Halperin, 1040 Schilling St., Chicago Heights, Ill.
Filed May 21, 1959, Ser. No. 814,747
7 Claims. (Cl. 40—137)

My invention relates to changeable display signs generally, and more particularly to display signs which are automatically operable to alternately change messages, indicia, or pictorial representation displayed thereon.

One of the objects of my invention is the provision of a display sign of the foregoing character having elements which are motor driven and shiftable in relation to stationary elements, to alternately display different word messages or pictorial representations.

Another object of my invention is the provision of a display sign of the foregoing character having a readily removable unit assembly bearing messages, indicia or pictorial representations which may be easily installed in or removed from a supporting structure thereby affording ready and convenient installation of a different unit assembly bearing other messages, indicia or pictorial representations.

Other and further objects and advantages of my invention will become apparent from the following description when considered in connection with the accompanying drawings in which:

Fig. 3 is a rear elevational view of the display sign structure illustrated in Figs. 1 and 2;

Fig. 4 is a top plan view looking in the direction of the arrows 4—4 of Fig. 3;

Fig. 5 is a front elevational view of the body member with the front panel and the message-bearing elements removed;

Fig. 6 is a cross-sectional view taken on line 6—6 of Fig. 1;

Fig. 7 is a cross-sectional view on line 7—7 of Fig. 1;

Fig. 8 is a plan view of a removable message-bearing unit assembly;

Fig. 9 is a plan view of a stationary indicia-bearing element of the unit assembly illustrated in Fig. 8;

Figs. 10 and 11 are fragmentary, horizontal, cross-sectional views taken though the unit assembly and showing the said elements thereof spread apart for clarity, and in different relative positions.

Figure 1:
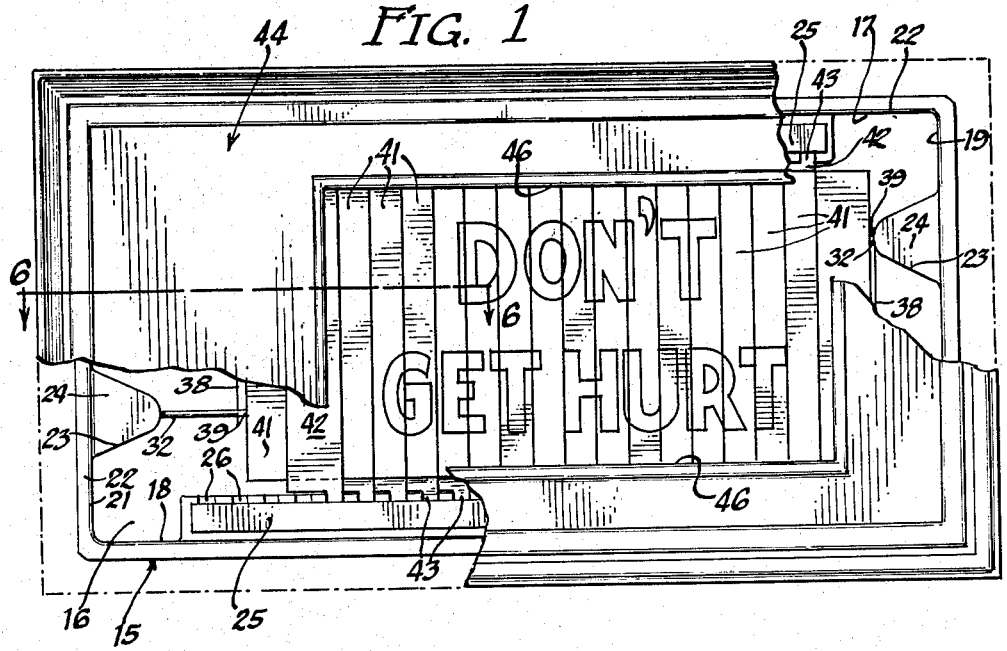
Figure 1 is a front elevational view of a display sign in accordance with my invention, the same displaying one portion of a word message, with certain parts broken away to show details of construction.

Referring to the drawings, my invention is illustrated as comprising preferably a molded support body 15 formed of any suitable material and of a generally rectangular shape. The body 15 has a generally dished form, having a back wall 16, side walls 17 and 18, and end walls 19 and 21, there being a perimetric flange 22 integral with the side and end walls. The end walls 19 and 21 are shaped substantially as illustrated in Figs. 3 and 5, affording a pair of recesses 23 at each end with opposite recesses being in longitudinal registration. Each of the recesses 23 has a top wall portion 24 integral with the end wall portions defining the recesses and also integral with the end portions of the flange 22. Each of the side walls 17 and 18 is formed to provide a series of spaced relatively shallow pockets 26 with corresponding pockets of opposite side walls being in registration. As seen clearly in Fig. 5, a strip of suitable material 25 overlies each of the series of pockets 26 affording a retaining member for the stationary indicia or message-carrying elements hereinafter to be described. An electric motor 27 is suitably secured in the center of the back wall 16, the motor shaft having a crank arm 28 fixed thereto and the crank arm being pivotally connected to one end of a link 29, the other end of which is connected to a rectangular member 31 which spans a pair of longitudinally extending rods 32 and is fixed thereto. The rods 32 pass through and are supported in suitable bearing apertures provided in the end walls 19 and 21. As will be apparent, when the motor 27 is energized to effect rotation of the crank arm 28, reciprocation of member 31, as well as of rods 32, is effected. The degree of movement of rods 32 is such that the ends thereof do not project beyond the end portions of the perimetric flange 22. A member 33, similar to member 31 and spaced therefrom, is fixed to rods 32 and moves simultaneously therewith.

The message or indicia-bearing unit assembly 34 illustrated in Fig. 8, comprises a base panel 36 which may be formed of cardboard or any suitable material, the length of said base panel being such that the end edges 37 thereof coincide with the outer edges of members 31 and 33. Each of the end edges 37 of the panel has an integral dovetail-shaped extension 38 which is intended to be inclined downwardly, as illustrated, each of the said extensions abutting respective outer edges of members 31 and 33 with the corner portions 39 engaging under rods 32 to secure base panel 36 on the movable members 31 and 33 and rods 32. The base panel 36, thus, is adequately secured to the rods 32 for movement therewith, but is readily removable therefrom for replacement or substitution of another unit assembly bearing a different word message, indicia or pictorial representation. Hingedly connected to base panel 36, as by strips of adhesive tape 40, is a series of rectangular elements 41 which may be formed of cardboard or the like, and which are arranged in overlapping relation. As seen clearly in Fig. 8, the free edge of any one of the elements 41 is spaced from the edge of the element which it overlaps. Thus, except for the element 41 which is disposd at the extreme left of Fig. 8 and is uppermost, the only surface area of any element 41 which is exposed is that portion which is between its outer edge and the outer edge of the element in superimposed relation thereto.

As is illustrated in Fig. 1, a word message is carried on the elements 41 with substantially each of the constituent parts extending over two or more elements. For example: in the word "DON'T" of the word message shown in Fig. 1, the letter "D" extends over three elements, while the letter "T" extends only over two elements. It will be understood, however, that each of the elements 41 may bear a letter of the alphabet complete in itself. All of the elements 41, of course, move simultaneously with the base panel 36.

Figure 2:
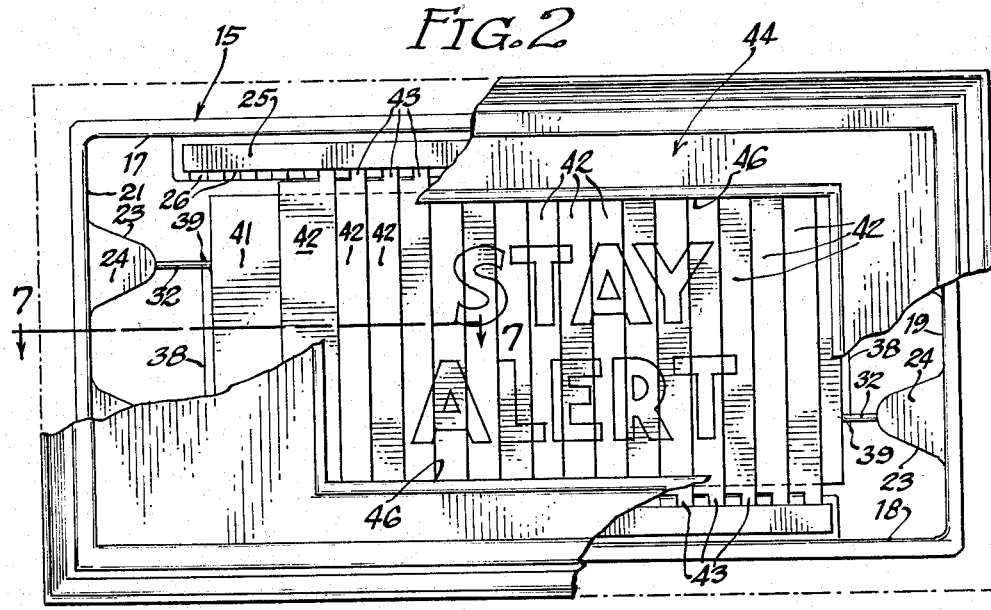
Fig. 2 is a similar view showing the display of an alternate or other word message portion and with other parts broken away to show details of construction.

Cooperating with the elements 41 are a series of elements 42, one of which is illustrated in Fig. 9. The element 42 preferably is formed of cardboard or other suitable material and is generally rectangular in shape with an extension 43 along one edge at opposite ends, the said extensions being in registration with each other. As illustrated clearly in Figs. 10 and 11, each element 42 is interposed between adjacent elements 41, and as illustrated in Figs. 1 and 2, the extensions 43 are received in opposed pockets 26 of the body 15. The elements 42 thus are secured in a stationary position against movement relative to the elements 41. The elements 42 similarly carry a word message with each of the elements carrying portions of such message. For example, in Fig. 2, the letter "S" is spread over three elements, while the letters "L" and "E" are spread over two elements. It will be understood, however, that each of the elements 42 may carry a complete letter of the alphabet by itself. The width of the element 42 is somewhat greater than the width of the exposed area of the element 41 so that there is always some overlapping of elements 42 by elements 41, even in the relationship illustrated in Fig. 11 wherein the word message carried on elements 42 is displayed, as is illustrated in Fig. 2. It will be understood, however, that the letters or indicia carried on the elements 42, occupy only the unlapped portion of said elements.

In operation, when the motor 27 is energized the crank arm 28 and link 29 effect reciprocating movement of the base panel 36 and rods 32, together with the elements 41, while the elements 42 are maintained in a stationary position. When the elements 41 are caused to be moved to the right, to the position illustrated in Figs. 1 and 6, the elements 41 completely overlie the elements 42 so that the edges of adjacent elements coincide with each other. Thus, any indicia carried on the elements 42 is concealed, leaving exposed for viewing only the word message or indicia carried on the elements 41, for example, the message "DON'T GET HURT" illustrated in Fig. 1. In the next movement of the crank arm 28, the base panel 36 and rods 32 are caused to be shifted to the left, with the elements 41 sliding over the surfaces of the elements 42 to the position illustrated in Figs. 2 and 7, thereby concealing from view the indicia or word message carried on the elements 41 and exposing to view the indicia or word message carried on the elements 42.

Thus, in a single cycle, both messages are displayed for viewing and continued rotation of the motor effects reciprocation of the base panel 36 to alternately display for viewing the messages or indicia carried on the elements 41 and 42 respectively.

A cover member 44 which may be formed of plastic or suitable material and provided with a suitable window opening 46, overlies the unit assembly 34 and conceals from view all of the structure except the portions of the elements 41 and 42 bearing the word messages or indicia.

The unit assembly 34 may be easily removed from base panel 36 by disengaging the corner portions 39 from rods 32 and lifting out panel 36 and associated parts, together with the elements 42. A unit assembly of identical structure, but bearing different word messages, indicia or pictorial representations may be readily substituted as a replacement, it being necessarily only to engage the corner portions of the end extensions under the rods 32 and to insert the extensions 43 of corresponding elements 42 in respective pockets 26.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. A changeable sign, comprising a body, a base panel arranged for reciprocating sliding movement relative to said body, a series of flat moveable elements each secured along one edge to said base panel in superimposed relation and moveable therewith, said elements being arranged with one element overlapping an adjacent element and with the edge of the overlapping element spaced from the edge of the overlapped element, said moveable elements bearing indicia on the unlapped surface portions, a series of stationary flat elements each secured against movement relative to said body, each of said stationary elements being interleafed between adjacent moveable elements and bearing indicia thereon means for reciprocating said base panel whereby said stationary elements are alternately covered and uncovered by adjacent moveable elements, the indicia on the moveable elements being exposed to view when the stationary elements are covered and the indicia on the stationary elements being exposed to view when the same are uncovered.

2. A changeable sign comprising a first series of flat moveable elements arranged with one element in superimposed overlapping relation to an adjacent element with each lower element having an unlapped surface portion and the unlapped surface portion of each element bearing indicia, a second series of flat stationary elements each bearing indicia, each element of said second series being interleafed between adjacent elements of said first series, means for reciprocating said first series of moveable elements whereby said stationary elements are alternately covered and uncovered by said moveable elements, the indicia on said moveable elements being exposed to view when said stationary elements are covered and the indicia on said stationary elements being exposed to view and the indicia of said moveable elements being concealed from view when said stationary elements are uncovered.

3. A changeable sign comprising a body, support means arranged for reciprocating movement in said body, a unit assembly carried on said support means, said unit assembly including a series of flat moveable elements with one moveable element in overlapping relation to an adjacent lower moveable element, the unlapped surface portion of each element bearing indicia, a second series of stationary elements with each element bearing indicia, each element of said second series being interleafed between adjacent elements of said first series, means for reciprocating said support means whereby said stationary elements are alternately covered and uncovered by said moveable elements, the indicia on the moveable elements being exposed to view when the stationary elements are covered and the indicia on the stationary elements being exposed to view and the indicia on said moveable elements being concealed from view when said stationary elements are uncovered.

4. The invention as defined in claim 3 in which the unit assembly is removably supported on said support means.

5. A changeable sign comprising a body having side and end walls, a series of spaced pockets arranged along each of said side walls, a pair of parallel rod members spacedly supported in said end walls for sliding movement, a base panel supported on said rod members for movement therewith, a series of flat moveable elements each secured at one edge to said base panel, said moveable elements being arranged with one element overlapping an adjacent element and with the edge of the overlapping element spaced from the edge of the overlapped element, said moveable elements bearing indicia on the unlapped surface portions, a series of stationary elements each having opposed extensions receivable in opposite pockets and being immoveable relative to said body, each of said stationary elements being interleafed between adjacent moveable elements and bearing indicia thereon, means for reciprocating said base panel whereby the stationary elements are alternately covered and uncovered by said moveable elements, the indicia on the moveable elements being exposed to view when the stationary elements are covered and the indicia on the stationary elements being exposed to view and the indicia on said moveable elements being concealed from view when said stationary elements are uncovered.

6. A changeable sign comprising a body, a base panel arranged for reciprocating sliding movement relative to said body, a series of flat moveable elements each secured along one edge to said base panel in superimposed relation and moveable therewith, said elements being arranged with one element overlapping an adjacent element and with the edge of the overlapping element spaced from the edge of the overlapped element, said moveable elements bearing indicia on the unlapped surface portions thereof, a series of stationary flat elements each secured against movement relative to said body, each of said stationary elements being interleafed between adjacent moveable elements and bearing indicia thereon, said moveable elements being moveable in one direction to cover the indicia on said stationary elements to expose to view the indicia on said moveable elements, said moveable elements being moveable in an opposite direction to cover the indicia on said stationary elements and being themselves covered by said stationary elements whereby to expose to view only the indicia on said stationary elements.

7. A changeable sign comprising a first series of flat moveable elements arranged with one element in superimposed overlapping relation to an adjacent element with each lower element having an unlapped portion and the unlapped portion of each element bearing indicia, a second series of flat stationary elements each bearing indicia, each element of said second series being interleafed between adjacent elements of said first series, said moveable elements being moveable in one direction to cover the indicia on said stationary elements whereby to expose to view the indicia on said moveable elements, said moveable elements being moveable in an opposite direction to uncover the indicia on said stationary elements and being themselves covered by said stationary elements whereby to expose to view only the indicia on said stationary elements.

References Cited in the file of this patent

UNITED STATES PATENTS

| | | |
|---|---|---|
| 729,599 | Jolly | June 2, 1903 |
| 1,036,820 | Pigoury | Sept. 11, 1953 |

FOREIGN PATENTS

| | | |
|---|---|---|
| 565,901 | France | Feb. 7, 1924 |
| 784,981 | France | July 30, 1935 |